Oct. 26, 1926.
E. REBECHINI
1,604,133
FEEDING MECHANISM
Filed Dec. 10, 1923  2 Sheets-Sheet 1
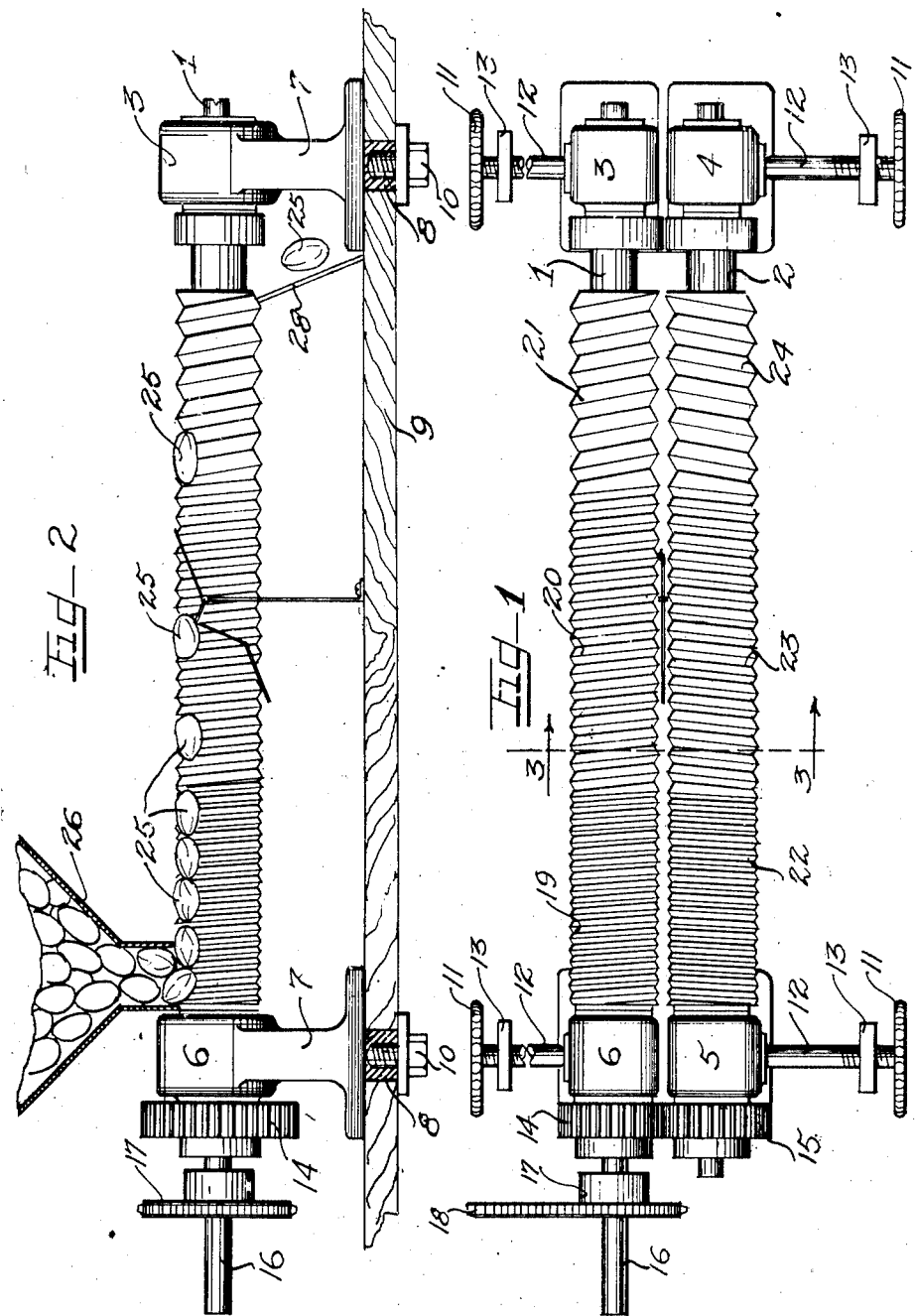
Inventor
Eugene Rebechini
By Charles Neuss
Attys

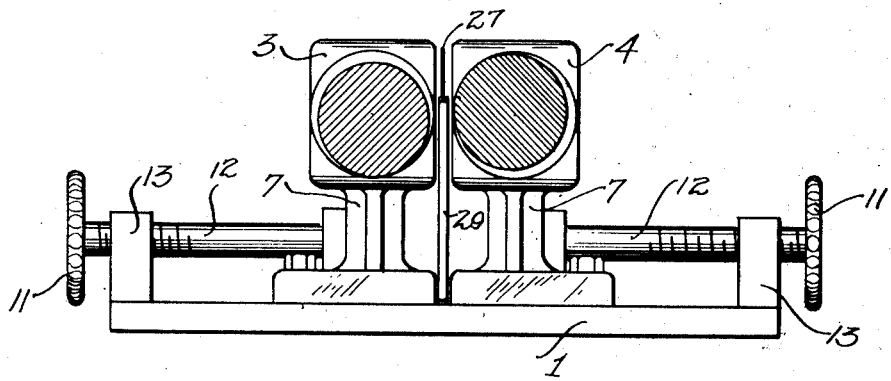
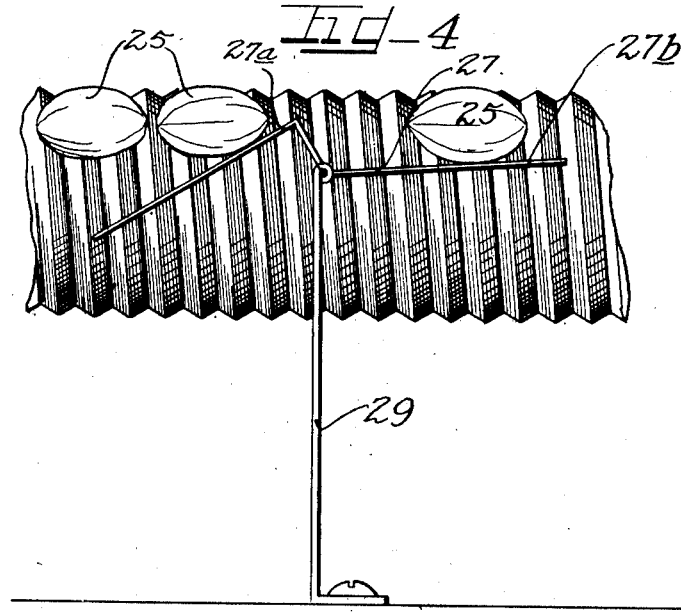

Patented Oct. 26, 1926.

1,604,133

UNITED STATES PATENT OFFICE.

EUGENE REBECHINI, OF CHICAGO, ILLINOIS.

FEEDING MECHANISM.

Application filed December 10, 1923. Serial No. 679,533.

This invention relates to a feeding mechanism and particularly to a mechanism or apparatus which is adapted to effect the individual feeding of articles deposited thereon in quantities from a common supply.

It is an important object of this invention to provide a feeding mechanism wherein the rates of progress of successively selected individual articles is progressively increased to separate the same from a plurality of similar articles originally supplied to the mechanism.

It is also an object of this invention to provide a feeding mechanism of the class described embracing article operated means for temporarily delaying the progress of succeeding articles through the mechanism.

It is another important object of this invention to provide a feeding mechanism for the purposes set forth, which is durable, effective, and which may be economically manufactured.

Other and further important objects of this invention will be apparent from the disclosures in the specification and accompanying drawings.

The invention (in a preferred form) is shown on the drawings and hereinafter more fully described.

On the drawings:

Figure 1 is a top plan view of a feeding mechanism embodying the principles of this invention.

Figure 2 is a side elevation of part of the feeding mechanism with the supply hopper shown in section.

Figure 3 is a slightly enlarged section on the line 3—3 of Figure 1.

Figure 4 is an enlarged detail elevation illustrating the article delaying means.

As shown on the drawings:

The feeding mechanism of this invention is particularly adapted for conveying articles such as nuts, candies, and the like, which are to be individually treated, and the improved mechanism provided is particularly adapted to separate such individual articles from a quantity of such articles originally deposited thereon and to individually discharge such articles at its discharge end. The feeding mechanism proper comprises two parallel screw conveyors which are mounted on shafts 1 and 2 respectively, said shafts being journalled in suitable end bearings 3, 4, 5 and 6. Said end bearings are each supported on brackets which are designated by the reference numeral 7, and said brackets 7 are each provided with a bottom boss or key 8 which is adapted to be engaged through a suitable slot in a supporting surface such as the top of a table 9. Said keys 8 and the brackets 7, and the bearings mounted thereon, are locked in adjusted position relative to the supporting surface 9 by suitable set-screws 10. The lateral adjustment of the brackets 7 and of the bearings supported thereon and the consequent alignment of the shafts 1 and 2 is effected by means of hand wheels 11 which are secured to the outer end of rods 12 connected to the bearings, said rods 12 having threaded portions engaged through threaded apertures in fixed vertical brackets 13. The shafts 1 and 2 are connected for simultaneous rotation in opposite directions by means of gears 14 and 15 which are in mesh with each other and which are secured to the ends of said shafts. The shaft 1 is preferably provided with an extension 16 having a suitable sprocket pulley 17 thereon for connection to a usual sprocket drive 18. It will of course be understood that the driving means for these shafts constitutes no special part of the present invention and any usual driving means may be employed. The screw conveyers which are mounted or formed on the shafts 1 and 2 are oppositely threaded so that the rotation of the shafts will serve to propel an article thereon and the threaded or conveying portions are divided into a plurality of sections 19, 20, 21, 22, 23 and 24, the threads of each section being of greater pitch than the threads of the preceding section, as will be clearly noted from an examination of Figures 1 and 2. Articles 25 which are to be conveyed by the mechanism are deposited on the threaded sections 19 and 22 between the shafts 1 and 2 from a suitable feed hopper 26. It will be apparent that when the first article from the mass of articles deposited on the sections 19 and 22 reaches the sections 20 and 23 having threads of greater pitch, that the speed of this article will be increased and that it will progress at a faster rate than the succeeding articles still remaining on the sections 19 and 22. This preceding article progresses at such higher rates of speed until it reaches a trigger member 27 which is pivotally mounted on a bracket 29 projecting upwardly between the shafts 1 and 2 and the conveyer members thereon. Said trigger member 27 ordinarily comprises a piece of stiff wire which is bent in the form shown in Figures 2 and 4 to afford an upwardly projecting angle portion, which I have designated by the reference numeral 27ª; after a preceding article has passed over said angle portion 27ª, the weight thereof on a straight portion 27ᵇ of said trigger member acts to move said angle portion upwardly into the position shown in Figure 4, thus temporarily delaying the progress of succeeding articles until the preceding article 25 reaches the threaded sections 21—24 which are of the greatest pitch and which act to quickly propel the individual article 25 from the mechanism onto a discharge chute 28. It will be apparent that since the preceding article 25 is moved from the straight portion 27ᵇ of the trigger member 27, that the angle portion 27ª will again drop into the position shown in Figure 2 to permit a succeeding article to pass thereover, where it again acts to move the trigger member into the position shown in Figure 4, thus again temporarily delaying the progress of further succeeding articles.

It will be apparent from the foregoing description that I have provided a feeding mechanism of simple construction which is particularly adapted for the feeding of articles deposited thereon in quantities, and the discharge of such articles individually so that a desired individual operation may be conveniently performed thereon. The mechanism is conveniently adjustable, has no parts which are liable to get out of order and may be economically manufactured.

I am aware that numerous details of structure may be varied through a wide range without departing from the principles of this invention and I therefore do not purpose limiting the patent granted hereon otherwise than necessitated by the prior art.

I claim as my invention:

1. In a mechanism of the class described, parallel screw conveyers and pivotally mounted means between said conveyers for temporarily delaying the progress of an article thereon, said means comprising a strip having an upwardly projecting angle portion, a straight portion, and a pivot intermediate of said portions.

2. In a mechanism of the class described, parallel screw conveyers and pivotally mounted means associated with said conveyers for temporarily delaying the progress of an article thereon, said means being actuated by the continuation of another article next ahead of said first mentioned article along said conveyers in the same plane thereof.

3. In a mechanism of the class described, parallel screw conveyers, pivotally mounted means between said conveyers for temporarily delaying the progress of an article thereon, and means for laterally moving said conveyers into a desired adjusted position.

4. In a mechanism of the class described, parallel screw conveyers having feeding threads thereon of progressively increasing pitch and pivotally mounted means between said conveyers for temporarily delaying the progress of an article thereon.

5. In a mechanism of the class described, parallel screw conveyers having feeding threads thereon of progressively increasing pitch and means operated by an article on the conveyer for temporarily delaying the progress of succeeding articles thereon.

In testimony whereof I have hereunto subscribed my name.

EUGENE REBECHINI.